US008294745B2

(12) United States Patent
Yamashita

(10) Patent No.: US 8,294,745 B2
(45) Date of Patent: Oct. 23, 2012

(54) OPTICAL WRITING DEVICE AND OPTICAL WRITING METHOD

(75) Inventor: Hidetoshi Yamashita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 194 days.

(21) Appl. No.: 12/859,859

(22) Filed: Aug. 20, 2010

(65) Prior Publication Data

US 2011/0043594 A1 Feb. 24, 2011

(30) Foreign Application Priority Data

Aug. 24, 2009 (JP) ................................. 2009-193345

(51) Int. Cl.
*B41J 2/385* (2006.01)
*B41J 2/435* (2006.01)
*H01S 3/13* (2006.01)

(52) U.S. Cl. ........ 347/236; 347/130; 347/237; 347/246; 347/247; 372/29.015

(58) Field of Classification Search ........................ None
See application file for complete search history.

(56) References Cited

U.S. PATENT DOCUMENTS 6,370,175 B1 * 4/2002 Ikeda et al. .................. 372/38.1
2008/0292342 A1 11/2008 Yamashita
2008/0309951 A1 12/2008 Kishi et al.
2009/0190943 A1 * 7/2009 Yamashita ...................... 399/51
2010/0066799 A1 3/2010 Yamashita
2010/0150591 A1 6/2010 Yamashita

FOREIGN PATENT DOCUMENTS

JP 10-83102 3/1998
JP 2002-141605 5/2002
JP 2007-298563 11/2007

OTHER PUBLICATIONS

U.S. Appl. No. 12/828,703, filed Jul. 1, 2010, Yamamoto, et al.

* cited by examiner

*Primary Examiner* — Matthew Luu
*Assistant Examiner* — Kendrick Liu
(74) *Attorney, Agent, or Firm* — Oblon, Spivak, McClelland, Maier & Neustadt, L.L.P.

(57) ABSTRACT

An optical writing device includes a light source that emits multiple laser beams; a separating unit that separates each of the multiple laser beams into a monitor beam and a scanning beam; a photoelectric converting element 218 that outputs a monitor voltage depending on a quantity of the monitor beam; a memory that stores an initial correction value for correcting a set common current; and a microcontroller that calculates a reference current, which is produced by correcting the common current updated on the basis of the monitor voltages with the initial correction values, obtains corrected currents by correcting the common current with the calculated correction values, controls each quantity of the laser beam on the basis of the corrected currents, and determines that the light source is degraded if a ratio of the corrected current to the reference current is larger than a predetermined threshold value.

18 Claims, 14 Drawing Sheets

FIG. 10

| | ROM AREA | | | RAM AREA | |
|---|---|---|---|---|---|
| CHANNEL NUMBER | MONITOR VOLTAGE Vpd AT EMISSION OF SET QUANTITY OF LIGHT | INITIALIZATION COMMON CURRENT Isw | CORRECTION VALUE Dev(0) | COMMON CURRENT Isw | CURRENT CORRECTION VALUE Dev(n) |
| ch1 | Vpd_1(0) | Isw(0) | Dev_1(0) | Isw(n) | Dev_1(n) |
| ch2 | Vpd_2(0) | | Dev_2(0) | | Dev_2(n) |
| ch3 | Vpd_3(0) | | Dev_3(0) | | Dev_3(n) |
| ch4 | Vpd_4(0) | | Dev_4(0) | | Dev_4(n) |
| ch5 | Vpd_5(0) | | Dev_5(0) | | Dev_5(n) |
| ⋮ | ⋮ | | ⋮ | | ⋮ |
| ch39 | Vpd_39(0) | | Dev_39(0) | | Dev_39(n) |
| ch40 | Vpd_40(0) | | Dev_40(0) | | Dev_40(n) |

OPTICAL WRITING DEVICE AND OPTICAL WRITING METHOD

CROSS-REFERENCE TO RELATED APPLICATIONS

The present application claims priority to and incorporates by reference the entire contents of Japanese Patent Application No. 2009-193345 filed in Japan on Aug. 24, 2009.

BACKGROUND OF THE INVENTION

1. Field of the Invention

The present invention relates to an optical writing device and an optical writing method.

2. Description of the Related Art

In an image forming apparatus that uses an electrophotographic method to form an image, image formation is performed in such a manner that a semiconductor laser irradiates a static electric charge formed on a photosensitive drum with a laser beam, thereby forming the electrostatic latent image, and the electric latent image is then developed into an image by using a developer. A conventional semiconductor laser emits one to four laser beams or at most about eight laser beams from one semiconductor element. Recently, a surface emitting laser, referred to as a VCSEL, has become commercially available and been put to practical use. Accordingly, in recent years, an image forming apparatus has been proposed that uses a VCSEL and performs high-precision, and high-speed image formation and the like.

A VCSEL can emit about 40 laser beams from one chip. Therefore, it is thought that high-precision, high-speed image formation and the like are made possible by using a VCSEL to form latent images. In the case of using a VCSEL as a laser device for latent image formation, a latent image having adequate characteristics cannot be formed simply by replacing a semiconductor laser with a VCSEL. For example, a VCSEL generates a number of laser beams in a planar form from a predetermined light-emitting region. A laser device used for latent image formation needs to control the light quantity of the emitted laser beam so that a target light quantity is met. Furthermore, in the case of a VCSEL, to form a high-precision latent image stably, it is required to enhance the degree of integration of laser beams in the light-emitting region and manage the light quantity of the laser beams.

Meanwhile, a light source, such as a semiconductor laser or a VCSEL, is subjected to the phenomenon of degradation due to static electricity or long-term use. An indication of degradation may be that a light quantity becomes smaller than the initial quantity even after the same amount of current is applied to the light source or that the light quantity of emitted light does not increase in proportion to an increase in the current applied.

Furthermore, the existing technologies for controlling a laser beam to have a target light quantity are based on the assumption that a light source such as a semiconductor laser or a VCSEL is not degraded. Consequently, when a degraded light source is subjected to the control of the light quantity, although the controlling side intends to light with the light of the target light quantity, the actual quantity of light emitted from the light source may not be the target light quantity due to the degradation. Therefore, even if the number of laser beams is increased or the higher-precision control of the light quantity is made, when the light source is degraded, the precise control of the light quantity cannot be made. As a result, it is not possible to provide a high-precision image, and in the worst case, a defective image is output.

For these reasons, various technologies for detecting degradation of a light source have been proposed. For example, in a technology proposed in Japanese Patent Application Laid-open No. 2002-141605, a device for measuring a voltage value correlating with a drive current currently applied to a light source is provided. The current voltage value is compared with a preset voltage value, and it is determined that the light source is degraded if the current voltage value exceeds the preset voltage value.

In the technology proposed in Japanese Patent Application Laid-open No. 2002-141605, degradation of the light source is determined based on a voltage value common to all image forming apparatuses which are produced. However, in general, even when the quantity of emitted light of each semiconductor laser is the same, the drive current differs among the semiconductor lasers. Consequently, the degradation level of the light source differs among the image forming apparatuses. As a result, even when the degradation level of a semiconductor laser does not affect the print image quality, it is determined that the semiconductor laser is degraded and the print job may be aborted.

Furthermore, in a technology proposed in Japanese Patent Application Laid-open No. H10-083102, an amount of initial current when a light source lights with a predetermined quantity of light is stored in a recording medium, an amount of later current when the light source lights with the predetermined quantity of light is compared with the initial current amount stored in the recording medium, and it is determined that the light source is degraded if the later current amount is increased by a specified ratio with respect to the initial current amount. In this method, an initial drive current can be measured and held by each image forming apparatus individually, so degradation of a light source can be determined without any effect of variations of light sources.

However, in general, a light source, such as a semiconductor laser or a VCSEL, has temperature characteristics even in a state where the light source is not degraded. Consequently, for example, when the light source is controlled to be applied with the same amount of current, the light quantity may decrease if the temperature surrounding the light source rises. Therefore, a unit for controlling the light quantity of the light source increases the amount of current to raise the light quantity to a target light quantity. In the method disclosed in Japanese Patent Application Laid-open No. H10-083102, even an increase in the amount of current increased in this way is recognized as an increase caused by degradation of the light source. Consequently, even when the light source is not actually degraded, there is a possibility of determining that the light source is degraded.

Furthermore, in the methods disclosed in Japanese Patent Application Laid-open No. 2002-141605 and Japanese Patent Application Laid-open No. H10-083102, a device for detecting the drive current of a light source is required, and in the case of a light source that emits multiple of beams, such as a VCSEL, as many devices for detecting a drive current as the number of the beams are required, and therefore, there is a problem in that the circuit size is increased, for example, several times.

SUMMARY OF THE INVENTION

It is an object of the present invention to at least partially solve the problems in the conventional technology.

According to an aspect of the present invention, there is provided an optical writing device including: a light source that emits multiple laser beams; a separating unit that separates each of the multiple laser beams into a monitor beam for measuring a quantity of light and a scanning beam for scanning a photoreceptor to form an image of image data; a photoelectric conversion unit that measures a light quantity of the monitor beam and outputs a monitor voltage with respect to each of the multiple laser beams depending on the light quantity of the monitor beam; a storage unit that stores therein a plurality of predetermined initial correction values with respect to the multiple laser beams as initial values of correction values for correcting a set common current which is common to the multiple laser beams and used for emitting the laser beams from the light source; a calculating unit that updates the common current on the basis of the monitor voltages, and calculates a reference current by correcting the updated common current with the initial correction values; a control unit that calculates correction values by updating the initial correction values on the basis of the monitor voltages, obtains corrected currents by correcting the common current with the calculated correction values, and controls each light quantity of each of the laser beams on the basis of each of the corrected currents; and a determining unit that obtains a ratio of the corrected current to the reference current, determines whether the ratio is larger than a predetermined threshold value, and determines that the light source is degraded if the ratio is larger than the threshold value.

According to another aspect of the present invention, there is provided an optical writing method that is executed by an optical writing device including a light source that emits multiple laser beams, the optical writing method includes: separating each of the multiple laser beams into a monitor beam for measuring a quantity of light and a scanning beam for scanning a photoreceptor to form an image of image data by a separating unit; measuring a light quantity of the monitor beam and outputting a monitor voltage with respect to each of the multiple laser beams depending on the light quantity of the monitor beam by a photoelectric conversion unit; storing a plurality of initial correction values predetermined with respect to the multiple laser beams in a storage unit as initial values of correction values for correcting a set common current which is common to the multiple laser beams and used for emitting the laser beams from the light source; updating the common current on the basis of the monitor voltage to calculate a reference current by correcting the updated common current with the initial correction values by a calculating unit; calculating correction values by updating the initial correction values on the basis of the monitor voltages to obtain corrected currents, which are produced by correcting the common current with the calculated correction values, in order to control each light quantity of each of the laser beams on the basis of the corrected currents by a control unit; and obtaining a ratio of the corrected current to the reference current, determining whether the ratio is larger than a predetermined threshold value to determine that the light source is degraded if the ratio is larger than the threshold value by a determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a table showing exemplar control values of the VCSEL stored in a ROM area of a microcontroller;

DETAILED DESCRIPTION OF THE PREFERRED EMBODIMENTS

Exemplary embodiments of an optical writing device and an optical writing method according to the present invention are explained in detail below with reference to the accompanying drawings. In what follows, the present invention is described in line with first and second embodiments; however, the present invention is not limited to these embodiments.

First Embodiment

Figure 1:
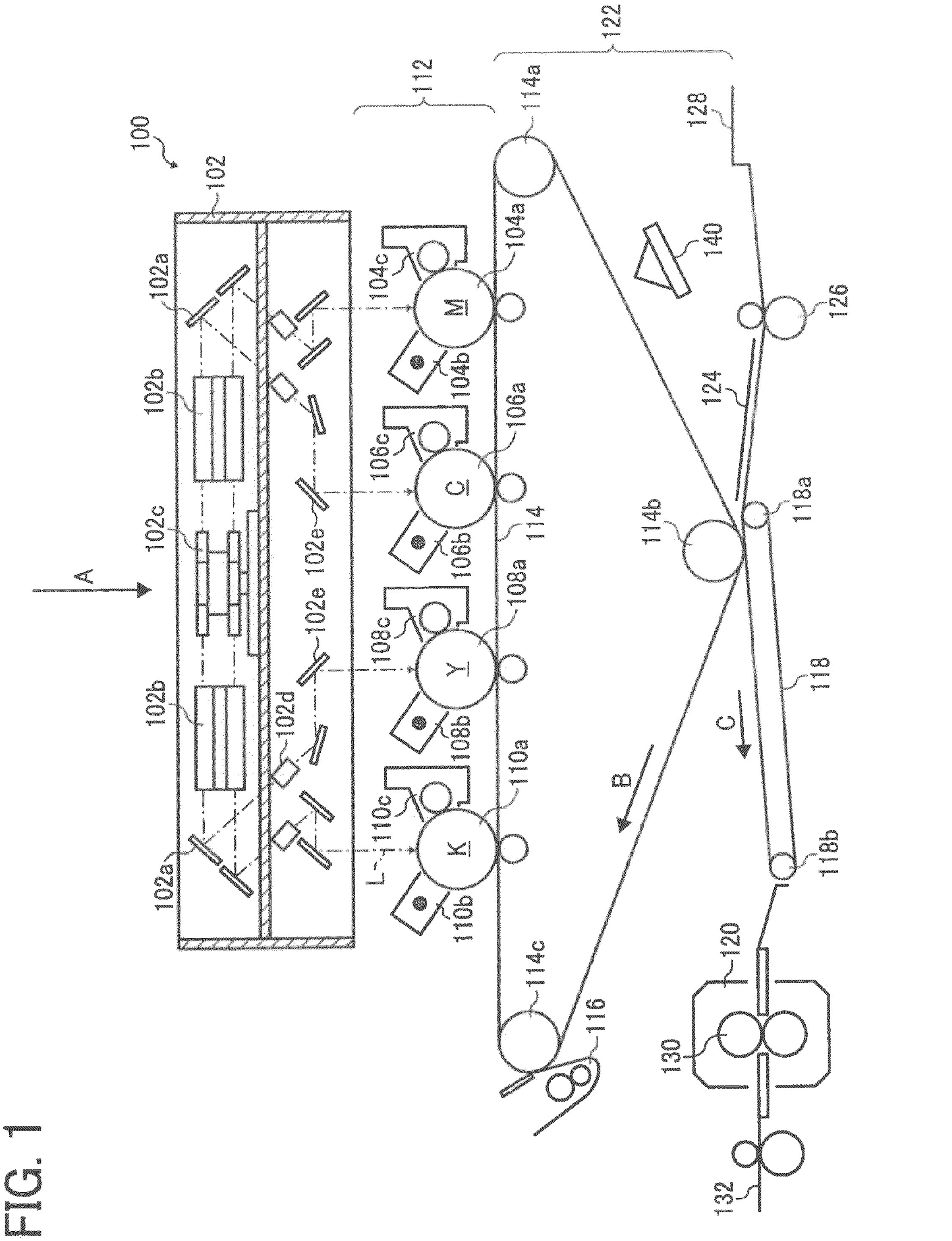
FIG. 1 is a schematic diagram of an image forming apparatus according to a first embodiment.

FIG. 1 illustrates a configuration of an image forming apparatus 100 according to the first embodiment. The image forming apparatus 100 is composed of an optical writing device 102 including optical elements such as a semiconductor laser, a polygon mirror, and the like; an image forming unit 112 including a photosensitive drum, a charging device, a developing device, and the like; and a transfer unit 122 including an intermediate transfer belt and the like. The optical writing device 102 causes an optical beam emitted from a light source such as a semiconductor laser element LD (not shown) to be deflected by a polygon mirror 102*c* and fall on an f-theta lens 102*b*. In the embodiment illustrated in FIG. 1, four optical beams corresponding to cyan (C), magenta (M), yellow (Y), and black (K) color images are generated. The optical beams pass through corresponding f-theta lenses 102*b*, and then are reflected by corresponding reflection mirrors 102*a*.

WTL lenses 102*d* adjust the shape of the optical beams and then deflect the adjusted optical beams toward reflection mirrors 102*e*. The photosensitive drums 104*a*, 106*a*, 108*a*, and 110*a*, are respectively irradiated with optical beams L for imagewise exposure. The irradiation of the photosensitive drums 104*a*, 106*a*, 108*a*, and 110*a* with the optical beams L are performed by using a plurality of optical elements as described above. Therefore, as for a main scanning direction and a sub-scanning direction, the timing to irradiate the photosensitive drum with the optical beam L is synchronized. Incidentally, hereinafter, the main scanning direction is defined as a scanning direction of the optical beam. The sub-scanning direction is defined as a direction perpendicular to the main scanning direction and, as in many image forming apparatuses, a rotating direction of the photosensitive drums 104*a*, 106*a*, 108*a*, and 110*a*.

Each of the photosensitive drums 104*a*, 106*a*, 108*a*, and 110*a* includes a photoconductive layer, which contains at least a charge generating layer and a charge transport layer, on a conductive drum made of aluminum or the like. Surface electric charges are applied to the photoconductive layers by chargers 104*b*, 106*b*, 108*b*, and 110*b*. The respective chargers 104*b*, 106*b*, 108*b* are arranged to correspond to the photosensitive drums 104*a*, 106*a*, 108*a*, and 110*a*, and each of the chargers is composed of a corotron, a scorotron, a charging roller, or the like.

Static electric charges applied onto the photosensitive drums 104*a*, 106*a*, 108*a*, and 110*a* by the chargers 104*b*, 106*b*, 108*b*, and 110*b* are imagewise exposed to the optical beams L, and electrostatic latent images are formed on the photosensitive drums 104*a*, 106*a*, 108*a*, and 110*a*. The electrostatic latent images formed on the photosensitive drums 104*a*, 106*a*, 108*a*, and 110*a* are developed into C, M, Y, and K developer images by developing units 104*c*, 106*c*, 108*c*, and 110*c*, each of which includes a developing sleeve, a developer supplying roller, a control blade, and the like.

The developer images carried on the photosensitive drums 104*a*, 106*a*, 108*a*, and 110*a* are transferred onto an intermediate transfer belt 114, which is driven to move in a direction of an arrow B by conveying rollers 114*a*, 114*b*, and 114*c*, in a superimposed manner. The superimposed C, M, Y, and K developer images, i.e., a multicolor developer image on the intermediate transfer belt 114 is conveyed to a secondary transfer unit in accordance with the movement of the intermediate transfer belt 114. The secondary transfer unit is composed of a secondary transfer belt 118 and conveying rollers 118*a* and 118*b*. The secondary transfer belt 118 is driven to move in a direction of an arrow C by the conveying rollers 118*a* and 118*b*. An image receiving medium 124, such as a high-quality paper sheet or a plastic sheet, is fed from an image-receiving-media containing unit 128, such as a sheet cassette, to the secondary transfer unit by a conveying roller 126.

The secondary transfer unit applies a secondary transfer bias to the intermediate transfer belt 114, thereby transferring the multicolor developer image carried on the intermediate transfer belt 114 onto the image receiving medium 124 attracted and held on the secondary transfer belt 118. The image receiving medium 124 is fed to a fixing device 120 in accordance with the movement of the secondary transfer belt 118. The fixing device 120 is composed of a fixing member 130, such as a fixing roller made of silicon rubber, fluorine-contained rubber, or the like. The fixing device 120 applies heat and pressure to the image receiving medium 124 to fix the multicolor developer image on the image receiving medium 124, and discharges the image receiving medium 124 on which the multicolor developer image is fixed to the outside of the image forming apparatus 100 as a printed material 132. After the multicolor developer image is transferred onto the image receiving medium 124, a cleaning unit 116 containing a cleaning blade removes transfer residual developers from the intermediate transfer belt 114 so that the intermediate transfer belt 114 can be ready for a next image forming process.

Incidentally, a sub-scanning-misalignment detecting device (not shown) is arranged near an end point of each of the photosensitive drums 104*a*, 106*a*, 108*a*, and 110*a* in the main scanning direction, and detects a misalignment in the sub-scanning direction.

Figure 2:
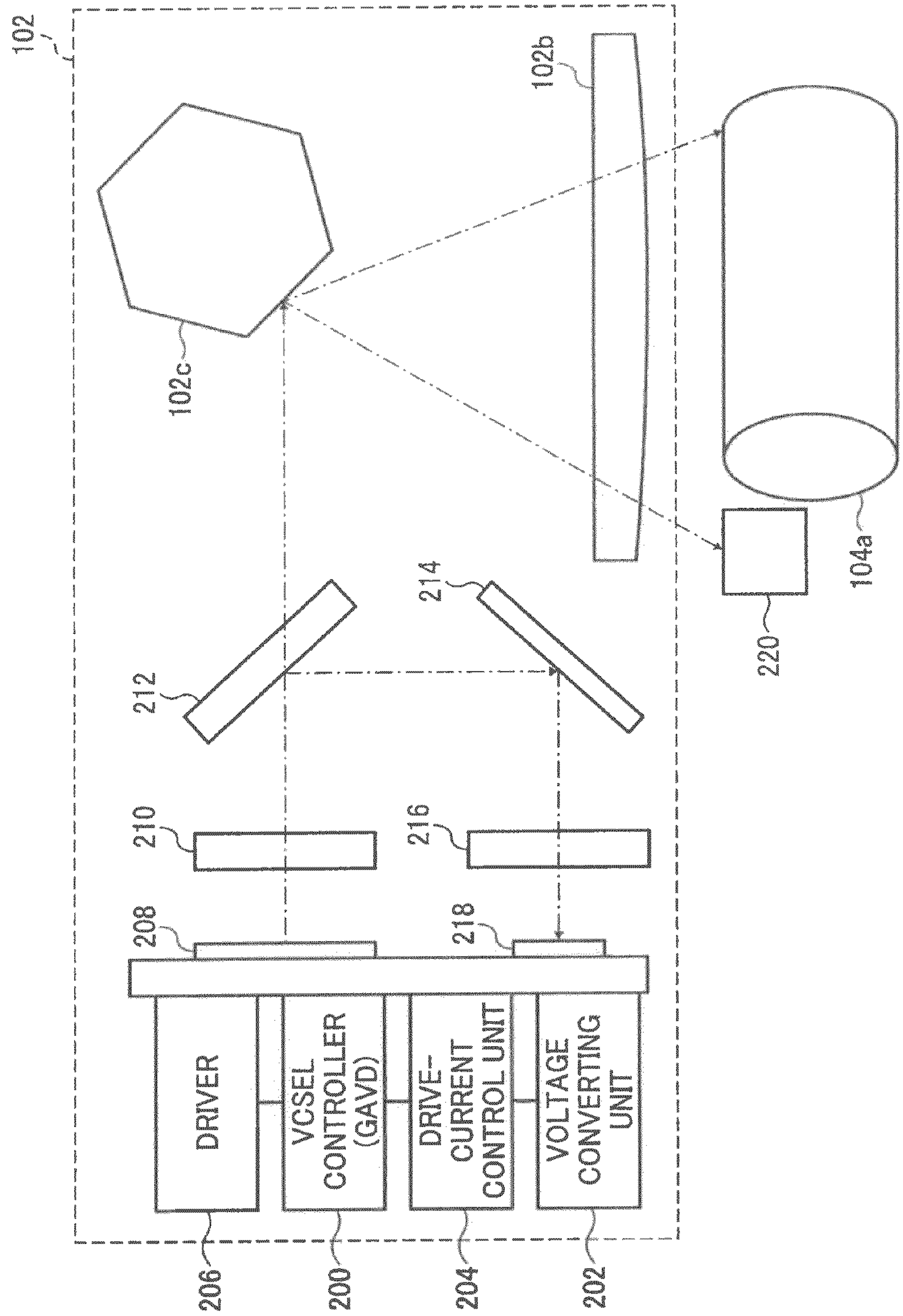
FIG. 2 is a schematic diagram illustrating a planar configuration of an optical writing device according to the first embodiment.

FIG. 2 illustrates a planar configuration of the optical writing device 102 of the image forming apparatus 100 viewed from a direction of an arrow A shown in FIG. 1. The optical writing device 102 is composed of a VCSEL controller (hereinafter, referred to as a "GAVD") 200 functioning as a control unit for controlling the driving of a VCSEL. The GAVD 200 is configured as an application specific integrated circuit (ASIC). The GAVD 200 receives a control signal from a main CPU 300, which controls image formation in the image forming apparatus 100, and outputs an instruction signal for controlling the driving of a VCSEL 208 to a driver 206. Furthermore, in response to a control signal from the main CPU, the GAVD 200 outputs a control signal with respect to the VCSEL 208, such as a factory adjustment signal, an initialization signal, a line automatic power control (APC) signal, and a sheet-interval APC signal, to the driver 206. The APC is to control a drive current applied to the light source to cause the light source to emit a predetermined quantity of light. The factory adjustment signal is a control signal for adjusting the factory default quantity of a scanning beam, i.e., a quantity of a scanning beam at the time of shipment of the image forming apparatus 100 from the factory. The line APC is a control for correcting a light quantity of a laser beam each time when a laser beam scans in the main scanning direction during the operation of the image forming apparatus 100. The sheet-interval APC is a control for correcting a light quantity of a laser beam in intervals between materials subjected to continuous printing of plural pieces (i.e., sheet intervals) in a different way from the line APC.

Figure 3:
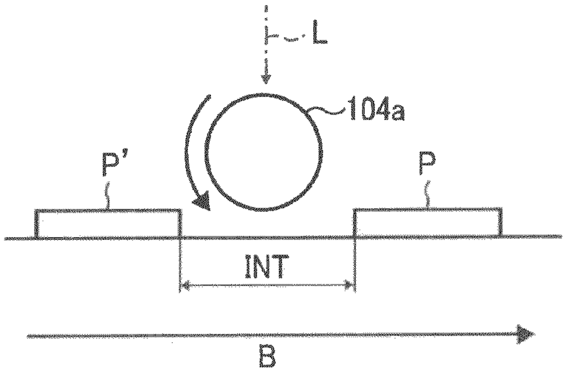
FIG. 3 is a diagram illustrating a concrete example of a timing of sheet-interval APC.

Specifically, for example, as shown in FIG. 3, in the case where the intermediate transfer belt moves in a conveying direction B, and then the photosensitive drum 104*a* is exposed to an optical beam L for forming a toner image for a sheet P, and after that, the photosensitive drum 104*a* is exposed to the optical beam L to form a toner image for a next sheet P'. In such a case, the sheet-interval APC is the control for performing correction of a light quantity of a laser beam that the GAVD 200 outputs in an interval denoted by INT, an interval between the exposures of the photosensitive drum 104*a* to the optical beam L.

The optical writing device 102 further includes the VCSEL 208 and the driver 206 that supplies a drive current to the VCSEL 208. The driver 206 receives various control signals output from the GAVD 200, such as a line APC signal, and then drives the VCSEL 208 by applying a drive current corresponding to each channel of the VCSEL 208 to the VCSEL 208 thereby causing the VCSEL 208 to generate laser beams. In the present embodiment, it is described that the VCSEL 208 emits 40 laser beams corresponding to 40 channels, respectively; however, the number of laser beams emitted is not particularly limited.

The laser beams are coupled into a parallel light by a coupling optical element 210, and after that, the laser beams are separated into a monitor beam and a scanning beam by an aperture mirror 212, which is a separating unit for separating a light. For the aperture mirror 212 is used a light reflective member as disclosed in Japanese Patent Application Laid-open No. 2007-298563, i.e., a light reflective member that lets some of beams through and reflects the rest of the beams. Incidentally, in the description below, if it is described simply as laser beams, it means the laser beams before being separated into a monitor beam and a scanning beam by the aperture mirror 212.

Figure 4:
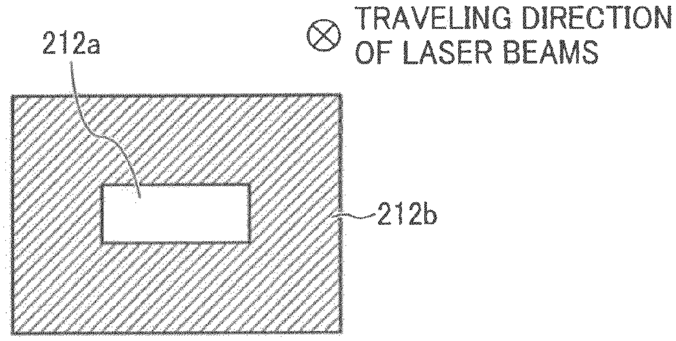
FIG. 4 is a diagram illustrating an aperture mirror made with use of a light reflective member viewed in a traveling direction of laser beams.
Figures 5A, 5B, 5C:
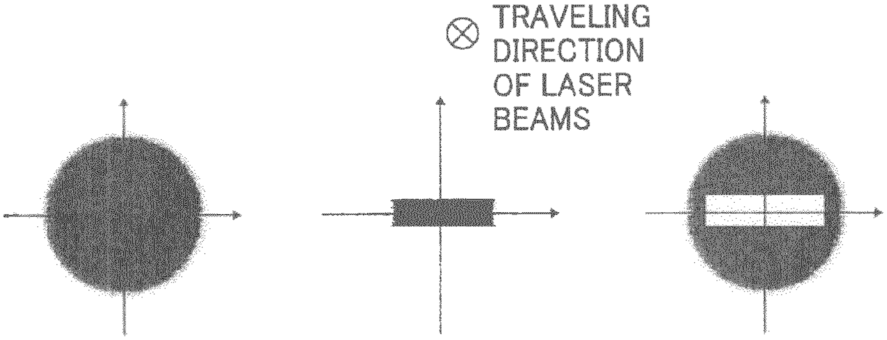
FIG. 5A is a diagram illustrating an example of the shape of beams before being shaped by the aperture mirror.
FIG. 5B is a diagram illustrating an example of a cross section of the beams after being shaped.
FIG. 5C is a diagram illustrating an example of a cross section of the beams that do not pass through the aperture mirror.

FIG. 4 is a diagram illustrating the aperture mirror 212 using the light reflective member viewed from a traveling direction of laser beams. The shape of the aperture mirror 212 also has a role in shaping the laser beams as shown in FIGS. 5A to 5C. When laser beams form a substantially round shape in cross section as shown in FIG. 5A, the laser beams are shaped into a substantially rectangular cross section as shown in FIG. 5B. FIG. 5C shows a cross section of the laser beams that do not pass the aperture mirror 212. The aperture mirror 212 reflects the laser beams shown in FIG. 5C, which are generally not used, by using a light reflecting portion 212*b*. The reflected beams are used as a monitor beam; on the other hand, the beams passing through an aperture portion 212*a* are used as a scanning beam (hereinafter, such a form of separation is referred to as an aperture mirror system).

Incidentally, a synchronization detecting device 220*a* containing a photodiode (PD) is arranged at the scanning start position of the photosensitive drum 104*a*. The synchronization detecting device 220*a* detects a scanning beam, and issues a synchronization signal for giving the timing of the various controls including the line APC (a first light-quantity correction).

The rest of the laser beams separated by the aperture mirror 212 are used as a monitor beam. The monitor beam is reflected to a second collective lens 216 by a total reflection mirror 214, and passes through the second collective lens 216, and then falls on a photoelectric converting element 218 such as a PD. The photoelectric converting element 218 generates a monitor voltage Vpd corresponding to a light quantity of the monitor beam. The generated monitor voltage Vpd is input to a voltage converting unit 202, and then transmitted to a drive-current control unit 204 that performs a calculating process. The drive-current control unit 204 outputs, for example, an 8-bit VCSEL control value calculated from a value of the monitor voltage Vpd, which corresponds to the quantity of the monitor beam to the GAVD 200. The GAVD 200 transmits the VCSEL control value generated for the control of a drive current by the driver 206 to the driver 206. Incidentally, the voltage converting unit 202 and the drive-current control unit 204 can be configured as separate modules, or can be integrally configured as a microcontroller including a ROM, a RAM, etc. for storing various control values used for various processes to be described later.

Figure 6:
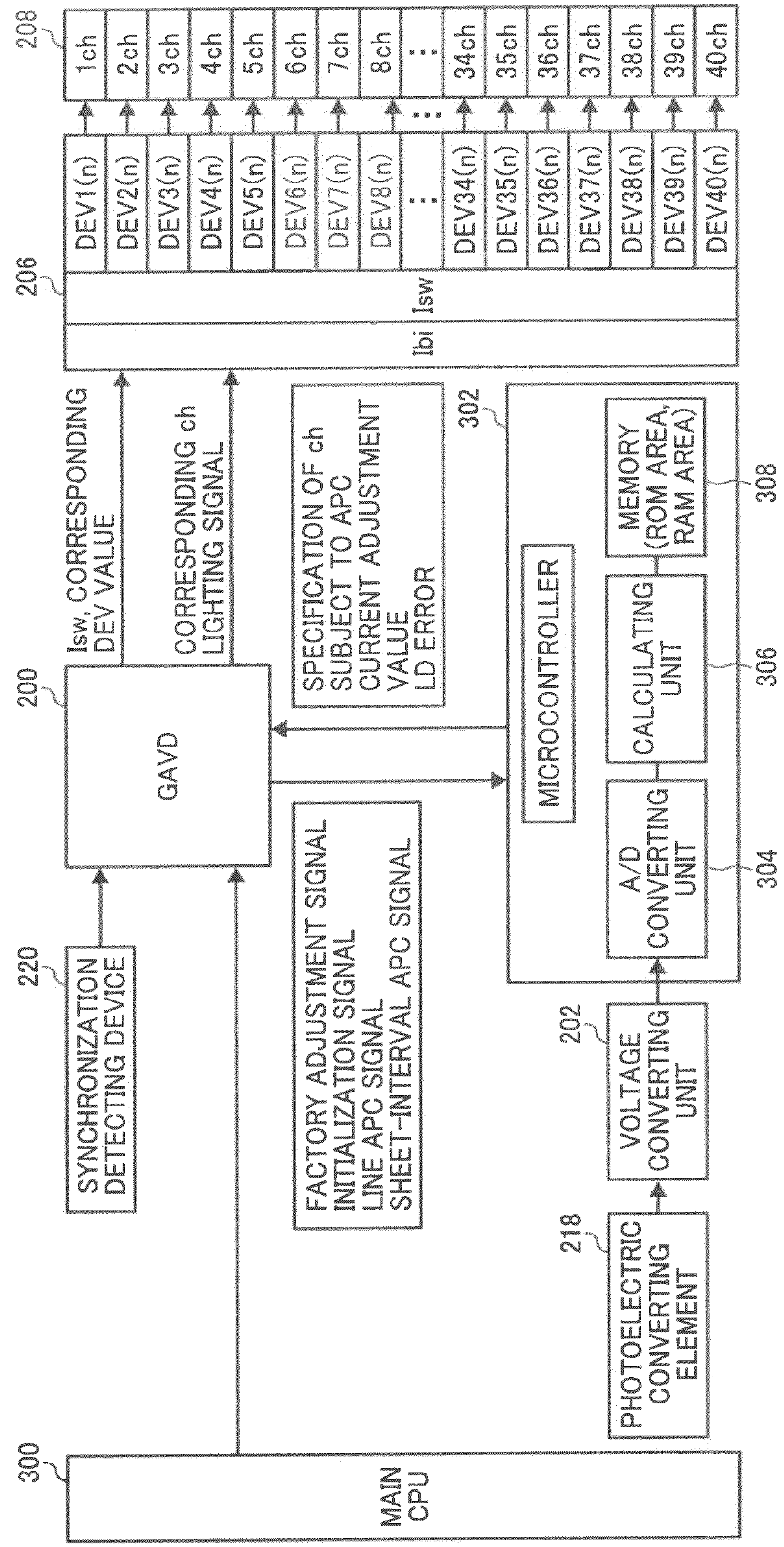
FIG. 6 is a detailed block diagram of a drive circuit of a VCSEL.

FIG. 6 is a detailed block diagram of a drive circuit of the VCSEL 208 illustrated in FIG. 2. Upon receiving a control signal from the main CPU 300, the GAVD 200 performs the factory setting of the VCSEL 208, the initialization operation, or the control at the time of operation of the synchronization detecting device 220. In FIG. 6, the voltage converting unit 202 shown in FIG. 2 is configured as an A/D converting unit 304, and the drive-current control unit 204 shown in FIG. 2 is configured as a calculating unit 306. The voltage converting unit 202 and the drive-current control unit 204 are implemented as a microcontroller 302, which includes a memory 308 for storing various control values used by the calculating unit 306 (the drive-current control unit 204) and the like. The memory 308 is composed of a ROM area and a RAM area. In the ROM area, factory default setting data, which is various data set for controlling a light quantity of a scanning beam or a monitor beam set at the time of shipment of the image forming apparatus 100 from the factory, and the like are stored. The RAM area is used as a register memory for storing values required for controlling a light quantity of a scanning beam or a monitor beam and the like.

To return to the explanation of FIG. 6, in response to an instruction from the GAVD 200, the microcontroller 302 performs the initialization operation using the factory default setting data and the light quantity of the monitor beam, and stores the values in a portion of the RAM area. After that, in response to an instruction from the GAVD 200, the microcontroller 302 calculates a value for the control at the time of operation. Furthermore, the microcontroller 302 updates various data for controlling the VCSEL 208 stored in the RAM area of the memory 308, and performs the control of a quantity of each laser beam emitted from the VCSEL 208 if an environmental change is caused by the control of the light quantity of the laser beam emitted from the VCSEL 208, heat generation of the image forming apparatus 100, or the like.

The VCSEL control value transmitted from the microcontroller 302 is transmitted to the GAVD 200. The VCSEL control value includes a digital value SW_D indicating a common current, a digital value BI_D indicating a bias current common to the channels, and a digital value DEV_D_ch (ch: a channel number) indicating a correction value set for each channel. Then, the GAVD 200 outputs the VCSEL control value to the driver 206 together with a lighting signal (ch lighting signal in FIG. 6) for lighting a light source corresponding to the corresponding channel. The driver 206 sets a drive current by performing PWM conversion on a current value calculated from the digital values included in the received VCSEL control value. The driver 206 also supplies a current of the drive current level to a channel identified by the ch lighting signal to feed it back to the quantity of the laser beam of the corresponding channel of the VCSEL 208.

In the driver 206, each channel is assigned to each semiconductor laser element LD. The driver 206 performs the PWM control on the VCSEL 208 on a channel-by-channel basis using a bias current Ibi, a common current Isw, and a correction value De_v ch. Incidentally, "ch" denotes the each channel of the VCSEL 208; in the present embodiment, any integer of 1 to 40 is entered into "ch" (ch=1 to 40).

Figure 7:
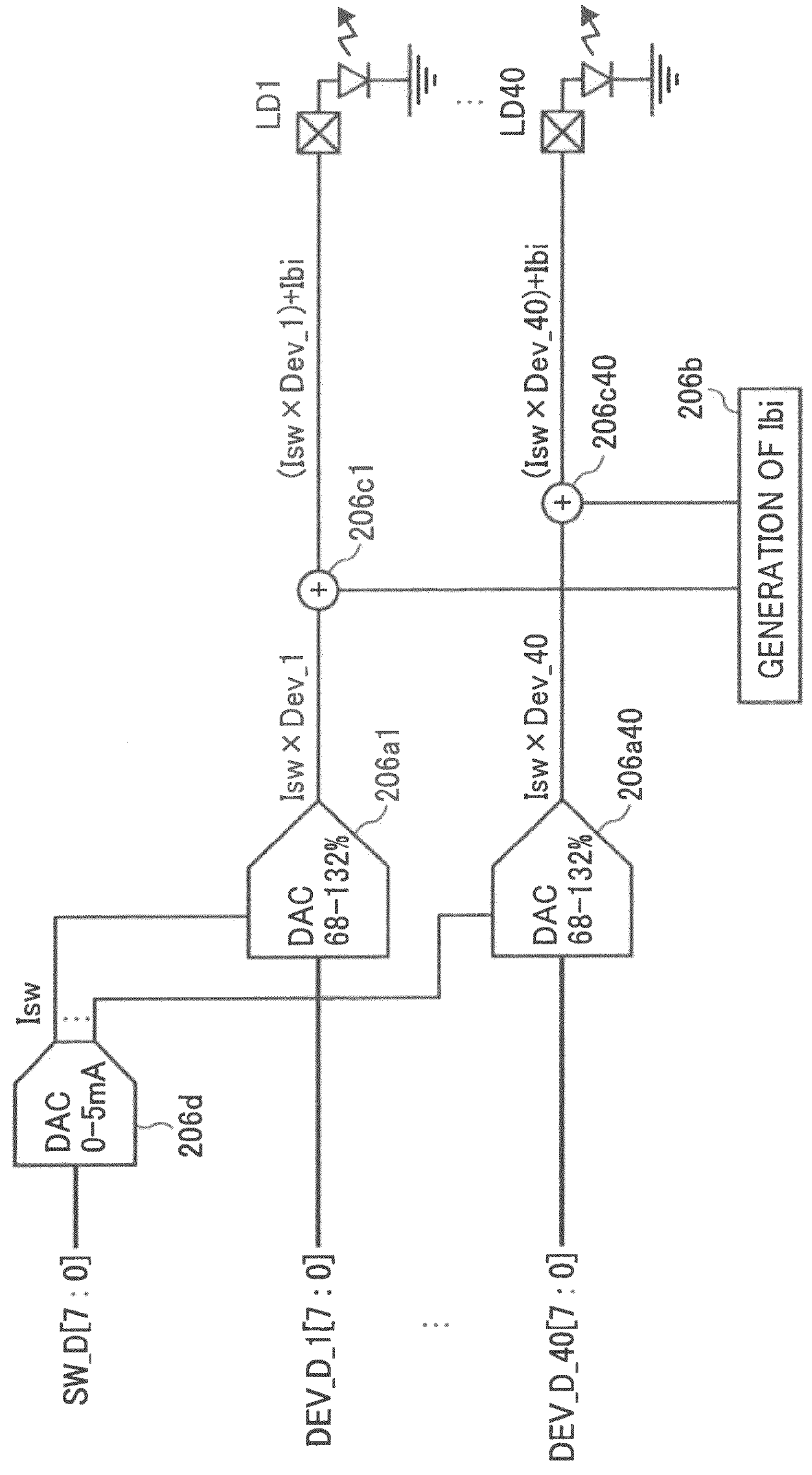
FIG. 7 is a block diagram illustrating details of a driver.

FIG. 7 is a block diagram illustrating details of the driver 206. In FIG. 7, the driver 206 is basically composed of a correction-value setting unit 206*a*, a bias-current setting unit 206*b*, an LD-current supplying unit 206*c*, and a common-current supplying unit 206*d*. The correction-value setting unit 206*a* and the LD-current supplying unit 206*c* are provided to each of the semiconductor laser elements LD. Each of the correction-value setting units 206*a* is supplied with the common current Isw from the common-current supplying unit 206*d*. The LD-current supplying unit 206*c* adds on a current value set in the correction-value setting unit 206*a* to a current value set in the bias-current setting unit 206*b*, and supplies the total current to the semiconductor laser element LD. As described above, there are 40 semiconductor laser elements LD for the 40 channels, so in FIG. 7, the channel-by-channel correction-value setting units 206*a* and the channel-by-channel LD-current supplying units 206*c* are identified by suffixing any integer of 1 to 40 indicating a channel number, ch1 to ch40, to their reference numerals.

The common-current supplying unit 206*d* supplies a common current Isw depending on a digital value SW_D input from the GAVD 200, which indicates the common current. For example, the common-current supplying unit 206*d* can be composed of a digital-to-analog converter which outputs a common current Isw from 0 mA to 5 mA in response to an 8-bit digital value SW_D[7:0].

The correction-value setting unit 206*a* sets Dev_ch, a correction value for correcting the supplied common current on a channel-by-channel basis, depending on a digital value DEV_D ch input from the GAVD 200, which indicates a correction value set for each channel. For example, the correction-value setting unit 206*a* can be composed of a DAC which outputs a value Dev_ch selected from 68% to 132% as a correction value for correcting the common current Isw in response to an 8-bit digital value DEV_D_ch[7:0]. Furthermore, the correction-value setting unit 206*a* outputs a corrected current (Isw×Dev_ch), which is corrected by multiplying the common current Isw by the correction value Dev_ch. Hereinafter, the corrected current, which is produced by correcting the common current with the correction value, is also referred to as a drive current.

The bias-current setting unit 206*b* sets a bias current Ibi common to the channels. For example, the bias-current setting unit 206*b* can be composed of a DAC which outputs a bias current Ibi from 0 mA to 5 mA in response to an 8-bit digital value BI_D[7:0].

The driver 206 including these units, for example, can supply a drive current of Isw×Dev_ch+Ibi to each semiconductor laser element LDch (ch: any integer of 1 to 40) for each channel.

Figure 8:
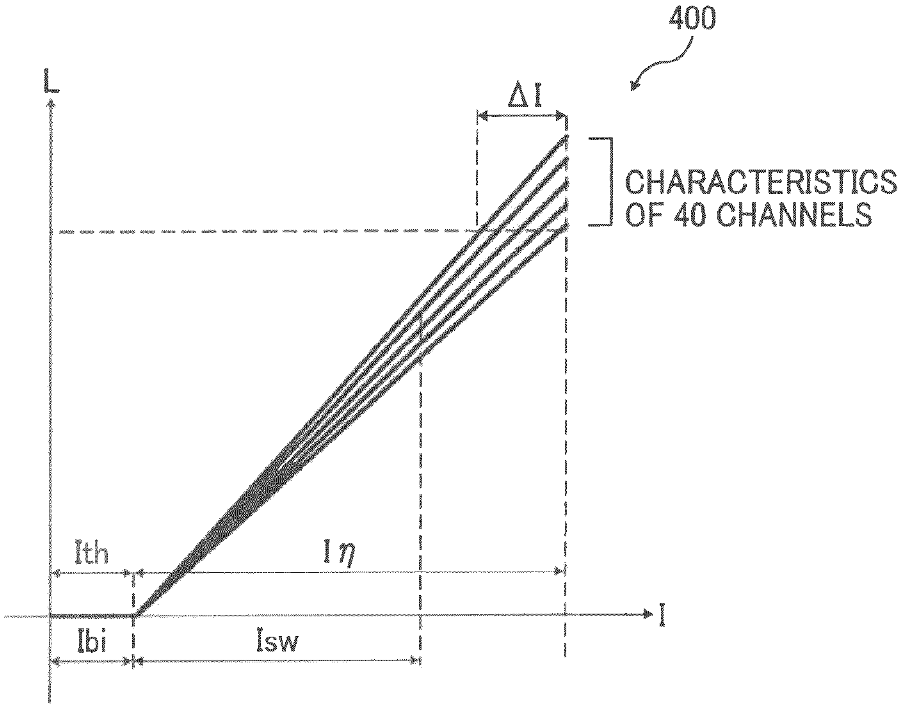
FIG. 8 is a graph illustrating output characteristics of laser beams in the first embodiment.

FIG. 8 is a diagram illustrating output characteristics of laser beams (hereinafter, referred to as "I-L characteristics") 400 in the present embodiment. Incidentally, it is explained as that the VCSEL 208 is composed of the 40 channels (1ch to 40ch) of the semiconductor laser elements LD. The semiconductor laser elements LD differ in a relationship between output (L) and the drive current level (I) depending on element characteristics. Therefore, when the same quantity of a laser beam is supplied to each of the semiconductor laser elements LD, there is a variation ΔI in drive currents Iη even at the default setting. Assuming that the vertical axis of the graph shown in FIG. 8 indicates a light quantity of a scanning beam on a photoreceptor, and the quantity of each of the laser beams that reaches the photoreceptor varies even though laser beams immediately after being emitted from the VCSEL 208 have the same light quantity. This is because a beam spread angle differs among the channels of the VCSEL 208, and thus a beam transmittance of the aperture mirror 212 varies among the channels. Consequently, to make the laser beams, which are emitted from the channels of the semiconductor laser elements LD, have the same light quantity on the photoreceptor, it is necessary to adjust differences in element characteristics among the channels and differences in transmittance of light up to the photoreceptor.

Figure 9:
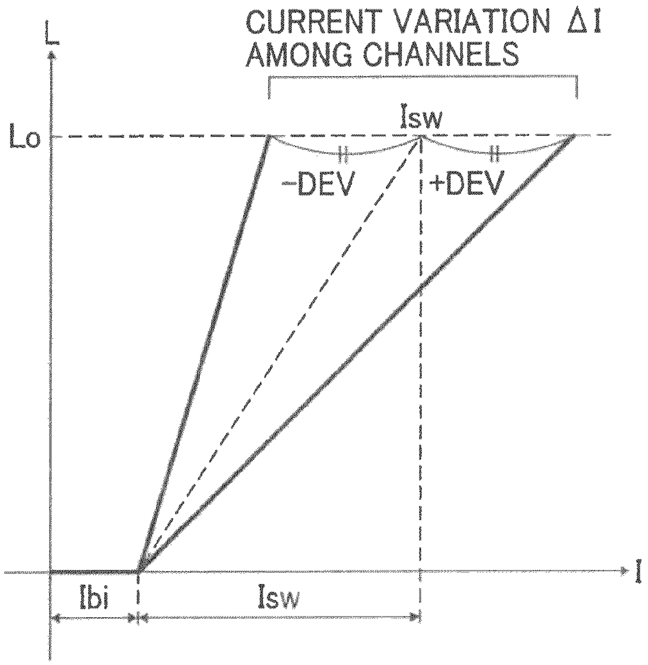
FIG. 9 is a graph illustrating an exemplar condition of a common current and correction values just after an initialization.

In the present embodiment, the driver 206 shown in FIG. 7 functions to absorb the differences. To set different current values adapted to the channels so as to make scanning beams on the photoreceptor have the same quantity, as shown in FIG. 9, the current Isw common to all the channels is set on the middle of the variation AI in drive currents Iη of all the channels. Furthermore, a current which is produced by multiplying the common current Isw by an individual correction value Dev_ch for each channel, is applied to each channel whereby the differences are absorbed.

FIG. 10 is a table showing an example of control values of the VCSEL 208 stored in the ROM area of the memory 308 which is a part of the microcontroller 302. As shown in FIG. 10, the control values of the VCSEL 208 represent various control values registered for each channel assigned to each semiconductor laser element LD. In the ROM area of the memory 308, a monitor voltage Vpd at the emission of a set quantity of light, an initialization common current Isw (Isw (0)), and an initial value of a correction value (hereinafter, referred to as an "initial correction value") Dev_ch(0) are stored as control values.

The monitor voltage Vpd at the emission of the set quantity of light is measured at the factory and is a monitor voltage converted into a digital value by the A/D converting unit 304 after being obtained by the photoelectric converting element 218 when each channel of the VCSEL 208 emits the set quantity of light. The initialization common current Isw(0) and the initial correction value Dev_ch(0) are a factory default current value for causing each semiconductor laser element LD to emit the set quantity of light and a correction value for correcting the current value. From these values, a current applied to increase a quantity of a monitor beam at the control of an initialization light quantity is calculated. Incidentally, "(0)" is a sign for representing a factory default value.

On the other hand, in the RAM area of the memory 308, correction values Dev_ch(n) (Dev_1(*n*) to Dev_40(*n*)) for causing the channels of the semiconductor laser elements LD to achieve the set quantity of light, which are obtained while the image forming apparatus 100 executes the image forming operation, and a common current Isw(n) are registered.

Incidentally, "(n)" is a sign for representing a value calculated during the execution of the image forming operation after the shipment from the factory. Namely, "n" is an integer equal to or larger than 1, and is used not for registering a specific number of times but for explaining a process of calculating correction values obtained through the line APC and the sheet-interval APC.

Figure 11:
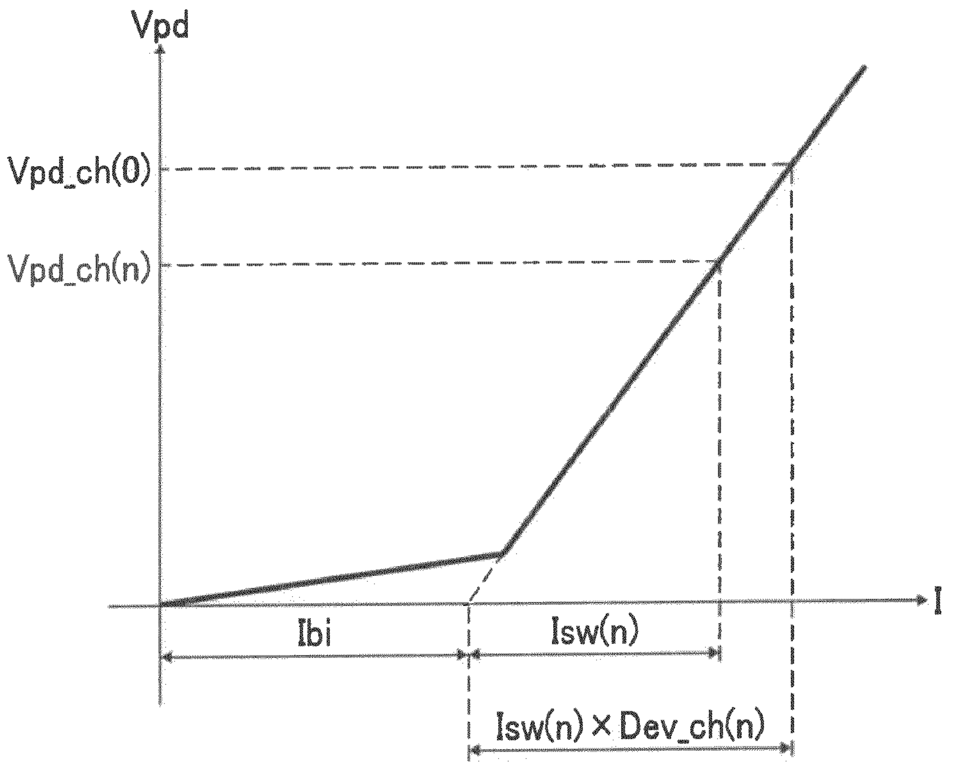
FIG. 11 is a graph illustrating a relationship when a correction value of line APC or the like is given in accordance with I-L characteristics (an I-L curve)

The relationship described above is applied only when a correction value Dev_ch(n) is in the relationship of I-L characteristics shown in FIG. 11. As shown in FIG. 11, if the set quantity of light is output, a monitor voltage obtained by the photoelectric converting element 218 shown in FIG. 2 is Vpd_ch(0). Here, at the time of the line APC, when it is detected that a monitor voltage obtained by the photoelectric converting element 218 is Vpd_ch(n), it is determined that the light quantity of the laser beam is decreased, and a correction value Dev_ch(n) preset depending on element characteristics is calculated and notified to the GAVD 200. When notified of the correction value Dev_ch(n), the GAVD 200 transmits a corresponding channel number and the correction value Dev_ch(n) to the driver 206.

The driver 206 generates a PWM signal by using the channel number and a digital value DEV_D_ch that indicates a correction value with respect to each channel number received from the GAVD 200, and supplies a drive current to the semiconductor laser element LD identified by the channel number.

Furthermore, Isw(n)×Dev_ch(n) shown in FIG. 11, which is a value that the common current is corrected by a correction value, is increased or decreased due to a change in temperature surrounding the VCSEL 208 or degradation of the VCSEL 208, so if it remains a fixed value, it may be beyond the correction range of the correction value Dev_ch(n). Consequently, at the time of VCSEL initialization operation and execution of the line APC, the microcontroller 302 calculates a correction value Dev_ch(n), and notifies the GAVD 200 of the calculated correction value Dev_ch(n). At this time, if the correction value Dev_ch(n) is beyond the correction range, the microcontroller 302 changes a value of the common current Isw(n) at the time of execution of the sheet-interval APC, and notifies the GAVD 200 of the changed value of the common current Isw(n). When notified of the value of the common current Isw(n), the GAVD 200 transmits the value of the common current Isw(n) to the driver 206. Incidentally, in the present embodiment, a value of the common current Isw(n) transmitted from the GAVD 200 is a digital value SW_D set by the 8-bit resolution, and the common current Isw(n) can be changed, for example, within a range of 0 mA to 5 mA.

The light-quantity control (APC) and a method for detecting degradation of the light source in the present embodiment are explained below.

(1) Factory Setting

At the factory, the microcontroller 302 records in the ROM area of the memory 308 a value of a monitor voltage converted from a monitor beam by the photoelectric converting element 218 when each channel of the VCSEL 208 emits the set light quantity of a scanning beam onto the surface of the photosensitive drum. In the measurement at this time, an optical sensor (not shown) is arranged at the position corresponding to the surface of the photosensitive drum, and data showing the correlation between a value of a monitor voltage and a quantity of a scanning beam on the surface of the photosensitive drum is obtained. The optical sensor is connected to a personal computer (hereinafter, referred to as a "PC"). The PC controls the GAVD 200, and transmits a factory adjustment signal to the calculating unit 306 via the GAVD 200.

The microcontroller 302 outputs an ON signal for turning on an operation enable signal of a channel subject to the factory adjustment first (ch1, in this case) to the GAVD 200. The GAVD 200 outputs the received ON signal to the driver 206. After the driver 206 receives the ON signal, the driver 206 gradually increases the common current Isw. Upon detecting that a quantity of a monitor beam of ch1 has reached the set light quantity, the optical sensor notifies the PC of this. When receiving the notification, the PC notifies the GAVD 200 that the quantity of the monitor beam of ch1 has reached the set light quantity. Then, the GAVD 200 notifies the microcontroller 302 that the quantity of the monitor beam of ch1 has reached the set light quantity. When receiving the notification, the microcontroller 302 records a monitor voltage Vpd_1(0), which is an output voltage from the photoelectric converting element 218 at the time, in the ROM area of the memory 308. The process described above is repeatedly performed until monitor voltages of all the 40 channels have been recorded.

Figure 12:
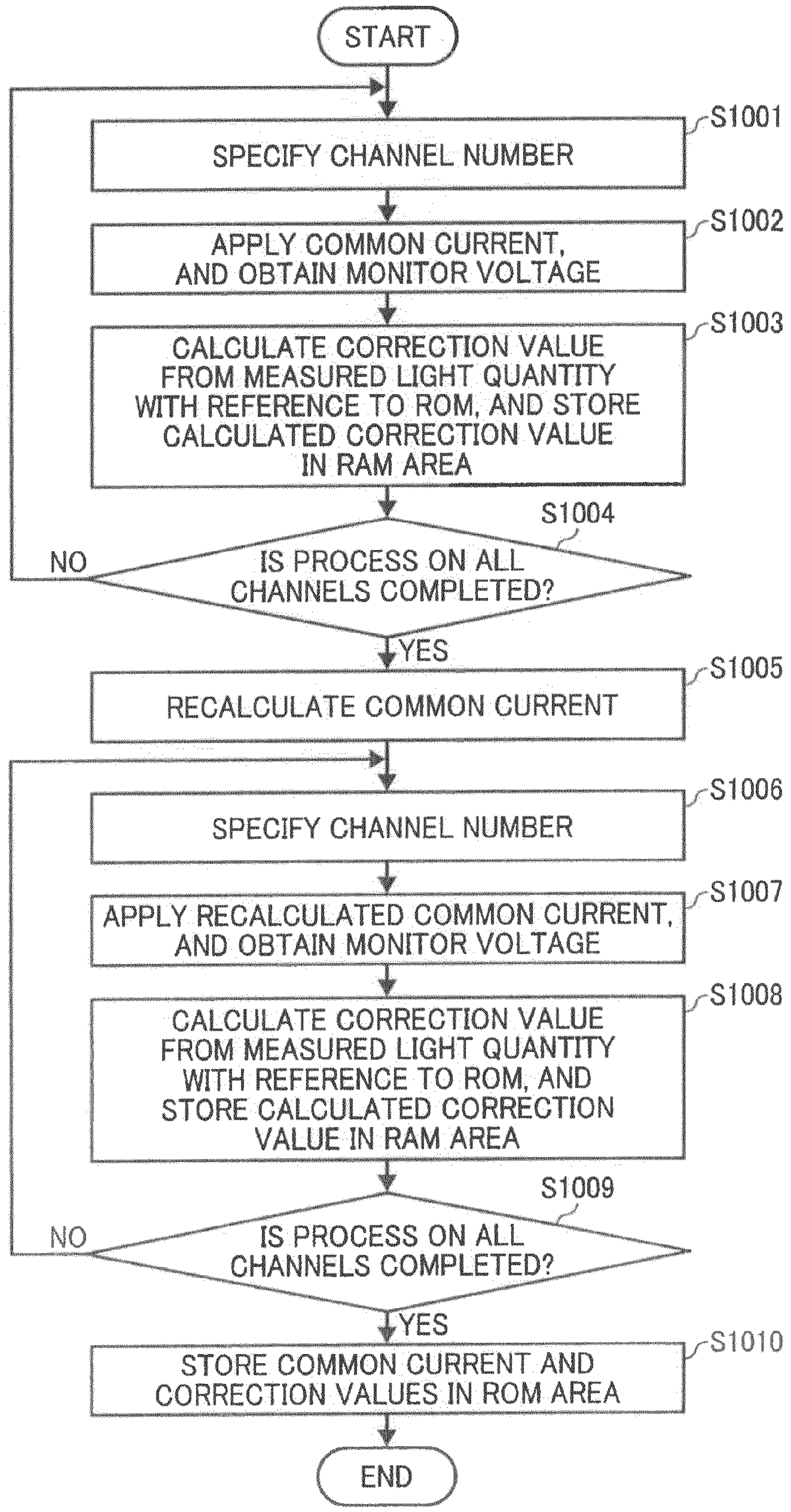
FIG. 12 is a flowchart illustrating a procedure of the APC control in the first embodiment.

Furthermore, at this time, the APC is once executed on the basis of the monitor voltages Vpd_1(0) to Vpd_40(0) written in the ROM area earlier. FIG. 12 is a flowchart illustrating an example of a procedure of the APC control.

At Step S1001, the microcontroller 302 transmits to the driver 206 via the GAVD 200 a channel number of the VCSEL 208 subject to the APC (for example, ch1) and the factory default Isw(0) recorded in the ROM area of the memory 308.

Then, at Step S1002, the GAVD 200 lights the channel 1 for a certain period of time with the factory default common drive current Isw(0) in synchronization with a synchronization detection signal (hereinafter, referred to as a "DETP signal") from the synchronization detecting device 220. While the channel 1 is lit for the certain period of time, the A/D converting unit 304 of the microcontroller 302 obtains a monitor voltage Vpd_1(1). After that, at Step S1003, the microcontroller 302 calculates a correction value of the channel 1 from the obtained monitor voltage Vpd_1(1) and value Vpd_1(0) output from the photoelectric converting element 218 at the emission of the set quantity of light, which is recorded in the ROM area and used as an initial value, i.e., calculates Dev_1(1)=Vpd_1(0)/Vpd_1.

At Step S1004, the microcontroller 302 determines whether the process on all the channels is completed. If the process on all the channels is not completed (NO at Step S1004), the process on the channel which has not been subjected to the process (ch2, ch3, . . . , ch40) is repeatedly performed in synchronization with a DETP signal (Step S1001).

If the process on all the channels is completed (YES at Step S1004), the microcontroller 302 recalculates the common current Isw (Step S1005). Specifically, the microcontroller 302 calculates a drive current Isw×Dev_ch, the product of the common current Isw and the calculated correction value Dev_ch, with respect to all the channels. Then, the microcontroller 302 calculates an average value of the drive currents Isw×Dev_ch or an average value of the maximum and minimum values of the drive currents Isw×Dev_ch, and updates the common current Isw to the calculated value.

Then, the microcontroller 302 obtains a correction value Dev_ch by the same procedure as Steps S1001 to S1003 (Steps S1006 to S1009). Then, at the time of factory adjustment, the recalculated common current Isw and the calculated correction values Dev_ch are written in the ROM area of the memory 308 as Isw(0) and Dev_ch(0) (Step S1010). In this manner, by recording the common current and the initial correction value in the ROM area of the memory 308 on a channel-by-channel basis, the setting of the image forming apparatus 100 at the factory is completed.

(2) Light-Quantity Control in Image Forming Apparatus

Figure 13:
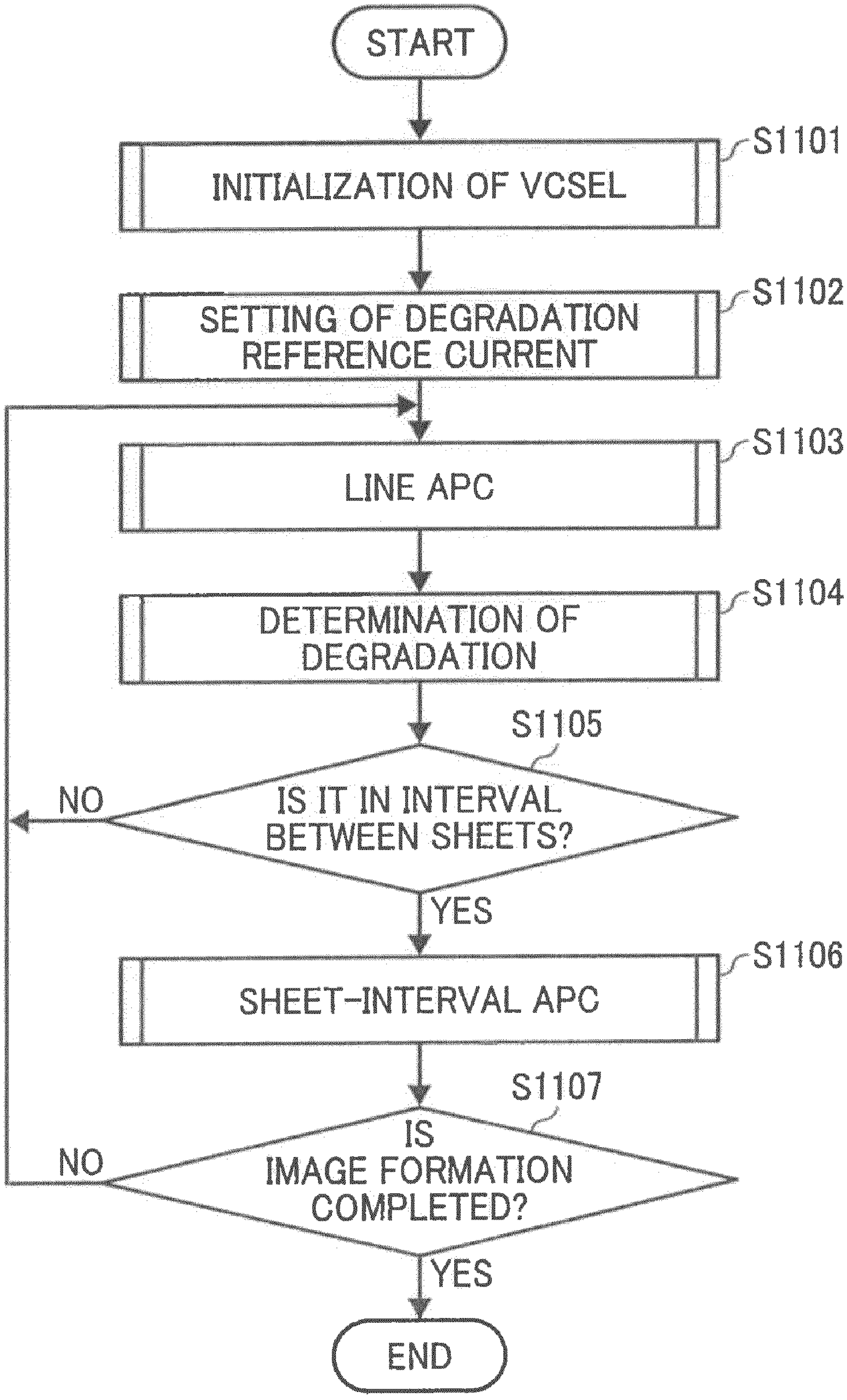
FIG. 13 is a flowchart illustrating a procedure of an image forming process in the first embodiment.

When the image forming apparatus 100 incorporates the photosensitive drums and is used by a user, the light-quantity control of the VCSEL 208 is executed at the start-up of the image forming apparatus 100 or the initiation of the operation of the image forming apparatus 100. FIG. 13 is a flowchart illustrating a processing procedure of an image forming process performed by the image forming apparatus 100. The image forming apparatus 100 generally forms an image on a high-quality paper sheet or a plastic film in the standardized size, such as B5, A4, B4, and A3. In the procedure explained below, the image forming apparatus 100 is already powered on by a user in advance, or the image forming apparatus 100 is in the automatic mode and in a state where the image forming apparatus 100 receives an image forming instruction from the user and is ready to start image formation.

First, initialization of the VCSEL 208 is performed at Step S1101. After completion of the initialization process, the setting of a reference current used as a criterion of degradation (hereinafter, referred to as a "degradation reference current") is made at Step S1102, and the line APC is executed at Step S1103, and then determination of degradation is performed at Step S1104. Then, whether it is in the interval between sheets is determined (Step S1105). If it is not in the interval between sheets (NO at Step S1105), the next line APC is repeatedly executed (Step S1103). If it is in the interval between sheets (YES at Step S1105), the sheet-interval APC is executed at Step S1106. After that, at Step S1107, whether the image formation is completed is determined. If the image formation is not completed (NO at Step S1107), the flow returns to Step S1103, and the line APC, the determination of degradation, and the sheet-interval APC are repeatedly executed. If the image formation is completed (YES at Step S1107), the image forming process is terminated.

(2-1) Initialization Operation of VCSEL

Figure 14:
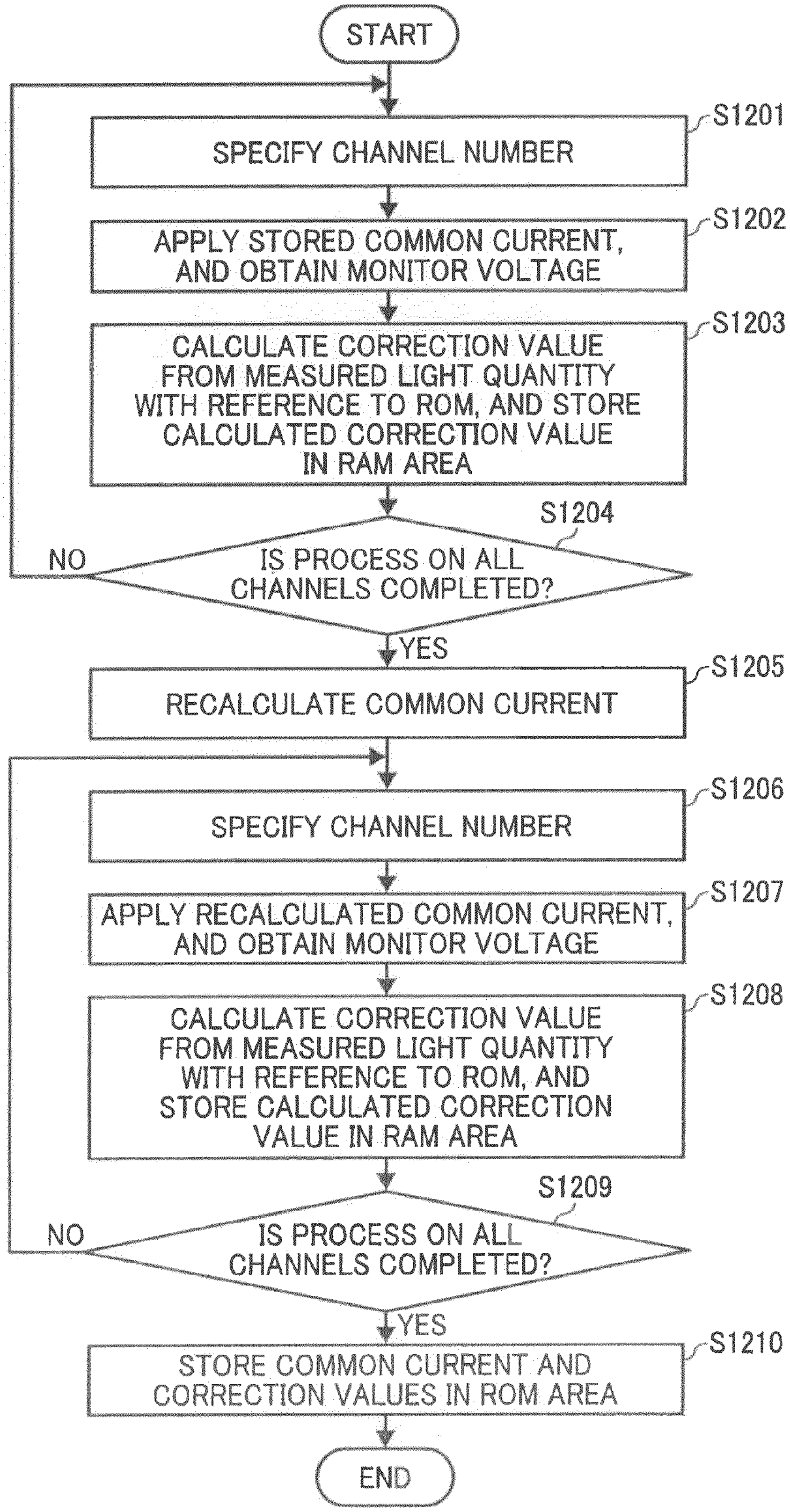
FIG. 14 is a flowchart illustrating a procedure of a VCSEL initialization process in the first embodiment.

Subsequently, the initialization process of the VCSEL performed at Step S1101 shown in FIG. 13 is specifically explained with reference to FIG. 14. In the procedure explained below, it is assumed that an initialization signal is transmitted from the main CPU 300 to the GAVD 200, and the GAVD 200 notifies the microcontroller 302 of the initialization signal, and it is in a state where it is ready to start the initialization process of the VCSEL. A flowchart of the initialization process shown in FIG. 14 is substantially the same as FIG. 12 illustrating the procedure of the APC control at the factory, and only Steps S1202 and S1210 are different from Steps S1002 and S1010 in FIG. 12.

Step S1202 differs from Step S1002 in that Isw(0) written in the ROM area of the memory 308 is used at the factory adjustment. Step S1210 differs from Step S1010 in that the recalculated common current Isw and the calculated correction values Dev_ch are written in the RAM area of the memory 308 as Isw(1) and Dev_ch(1).

Incidentally, when the initialization process is completed, the polygon mirror 102*c* is rotated, and an intended channel of the VCSEL 208 is lit up a few millimeters short of the synchronization detecting device 220, whereby a synchronization signal for determining the write start position of an image is input to the GAVD 200.

(2-2) Setting of VCSEL Degradation Reference Current

Subsequently, the procedure for the setting of a degradation reference current performed at Step 51102 shown in FIG. 13 is explained. The degradation reference current is set on a channel-by-channel basis. The microcontroller 302 calculates a degradation reference current from Isw(1)×Dev_ch (0), the product of the initial correction value Dev_ch(0) recorded in the ROM area of the memory 308 and the common current Isw(1) obtained at the time of initialization (a calculating unit). The microcontroller 302 records the calculated degradation reference current in the RAM area of the memory 308 (a storage control unit).

The method disclosed in Japanese Patent Application Laid-open No. H10-083102 described above corresponds to calculation of a reference current for detecting degradation of the VCSEL by calculating Isw(0)×Dev_ch(0) using Isw(0) at the time of factory adjustment. In the present embodiment, the common current Isw(1) at the start-up of the apparatus is used. This is because the VCSEL 208 and other semiconductor lasers have temperature characteristics in the relationship between an amount of emission and a drive current. Even when the light source is not degraded, an amount of current when the light source is controlled to emit the same quantity of light varies if the temperature surrounding the light source changes.

Namely, for example, an amount of current, to which the APC control is performed so as to achieve a predetermined quantity of light when the surrounding temperature at the time of factory adjustment is 20° C., is different from an amount of current, to which the APC control is performed so as to achieve a predetermined quantity of light at the start-up of the apparatus when the temperature of the shipping destination is 30° C., to the extent of the difference in temperature due to temperature characteristics. Therefore, in the method of storing an amount of current at the time of factory adjustment and using the amount of current as a reference amount of degradation of the light source at the shipping destination as disclosed in Japanese Patent Application Laid-open No. H10-083102, a difference in amounts of currents due to a difference in temperature between the factory and the shipping destination may be incorrectly detected as degradation of the light source.

In the present embodiment, an amount of current at the start-up of the apparatus at the shipping destination is used as a reference. Consequently, a current variation due to the difference in the temperature characteristics between at the shipment from the factory and at the start-up of the apparatus at the shipping destination is absorbed, and thus an increase in drive current due to later degradation of the light source can be correctly detected.

(2-3) Line APC

The image forming apparatus 100 begins the image forming operation using a correction value Dev_ch determined in the initialization operation. Furthermore, during the copy operation, the image forming apparatus 100 performs image formation by controlling a light quantity of each laser beam in accordance with environmental changes using the line APC. Incidentally, the calculation of Dev_ch and control of a quantity of each of laser beams since the initialization operation are hereinafter referred to as the "line APC".

Figure 15:
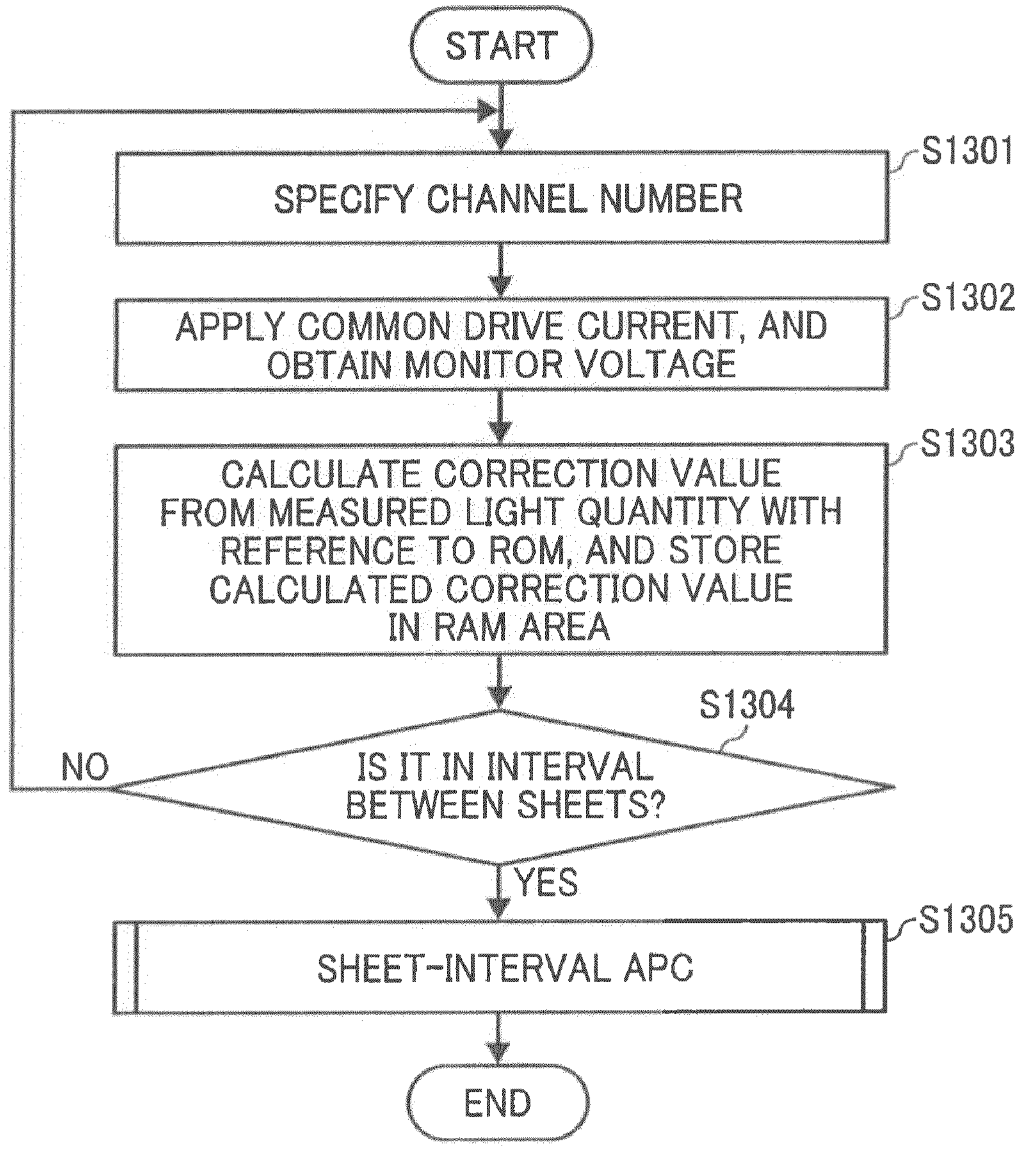
FIG. 15 is a flowchart illustrating a procedure of the line APC in the first embodiment.

FIG. 15 is a flowchart illustrating an overall flow of the line APC. After completion of the initialization process, the line APC is performed with each scanning of a main scanning line in synchronization with a DETP signal. When the GAVD 200 receives a DETP signal from the synchronization detecting device 220, the GAVD 200 transmits a line APC signal to the microcontroller 302. When receiving the line APC signal, the microcontroller 302 updates the correction value Dev_ch of the identified channel.

The method of updating the correction value Dev_ch is basically substantially the same method as in the initialization process. Namely, first, at Step S1301, the microcontroller 302 transmits a channel number of the VCSEL 208 subject to the line APC (for example, ch1) to the GAVD 200.

Then, at Step S1302, the GAVD 200 lights the channel 1 for a certain period of time by applying the common drive current Isw(n). While the channel 1 is lit for the certain period of time, the A/D converting unit 304 of the microcontroller 302 obtains a monitor voltage Vpd_1(*n*). After that, at Step S1303, the microcontroller 302 calculates a correction value Dev_1 (*n*) of the channel 1 from the obtained monitor voltage Vpd_1 (*n*) and a value Vpd_1(0) output from the photoelectric converting element 218 at the output of the set quantity of light, which is recorded in the ROM area and used as an initial value. That is, the microcontroller 302 divides Vpd_1(0) by Vpd_1(*n*) (Vpd_1(0)/Vpd_1(*n*)), and updates the correction value Dev_ch of the channel 1.

The line APC for one channel is completed in the cycle of one synchronization signal (DETP signal). After that, at Step S1304, the microcontroller 302 determines whether it is in the interval between sheets. If it is not in the interval between sheets (NO at Step S1304), the line APC for the next channel is performed (Steps 51301 to S1303). If it is in the interval between sheets (YES at Step S1304), the process of sheet-interval APC is performed (Step S1305). The sheet-interval APC is described later.

(2-4) Determination of Degradation of Light Source

Figure 16:
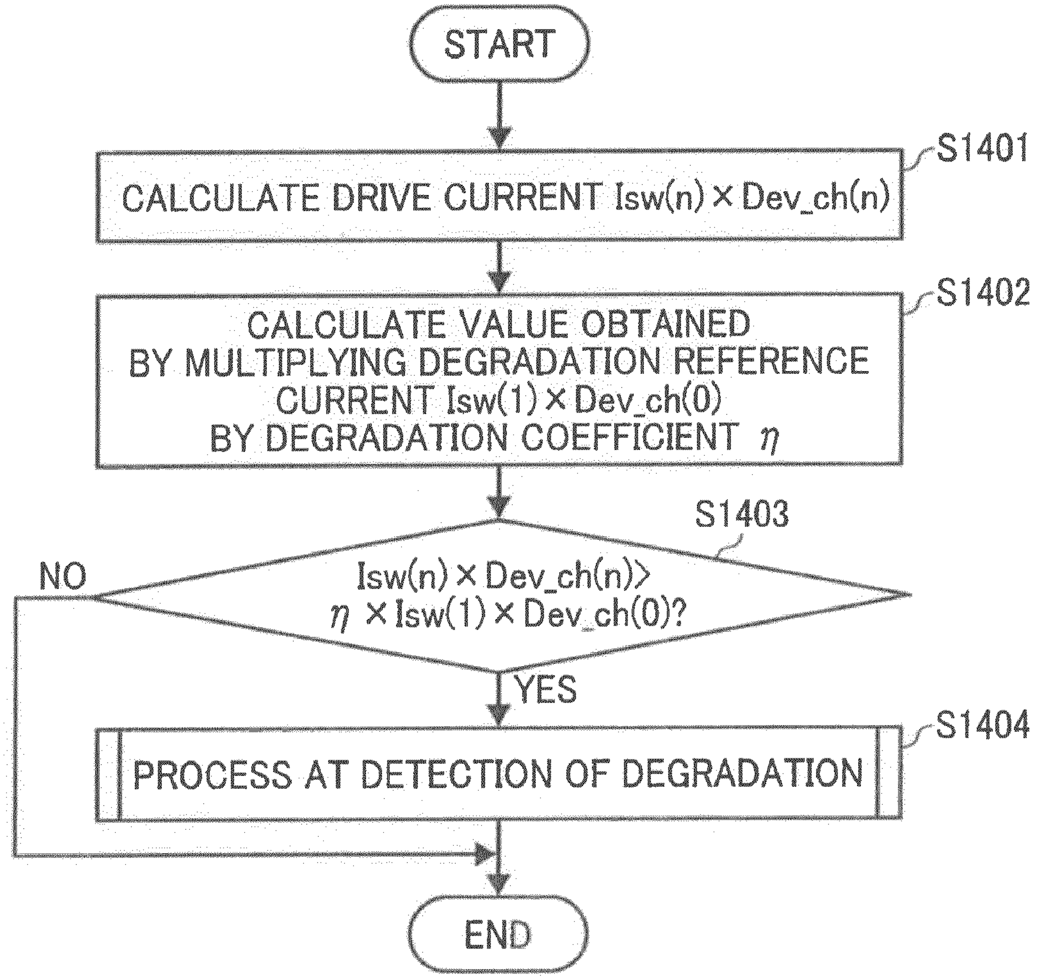
FIG. 16 a flowchart illustrating a procedure of a degradation determining process in the first embodiment.

Subsequently, the process of determining degradation at Step S1104 shown in FIG. 13 is specifically explained with reference to FIG. 16. In the degradation determining process, degradation of the light source is determined from the degradation reference current set at Step S1102 and a result of the line APC at Step S1103.

First, at Step S1401, the microcontroller 302 obtains a drive current Isw(n)×Dev_ch(n) of the channel subjected to the line APC. Then, at Step S1402, the microcontroller 302 calculates a value of η×Isw(1)×Dev_ch(0). The degradation reference current Isw(1)×Dev_ch(0) is obtained after the initialization operation. η is a predetermined degradation coefficient. The degradation coefficient η is generally set at about 1.2. Then, at Step S1403, the microcontroller 302 calculates a ratio of the drive current to the degradation reference current, and determines whether the ratio is larger than a threshold value (a degradation coefficient), thereby determining whether the light source is degraded (a determining unit). Specifically, the microcontroller 302 determines whether the drive current Isw(n)×Dev_ch(n) is larger than η×Isw(1)×Dev_ch(0), the product of the degradation reference current and the degradation coefficient. Then, if the drive current is larger than the product of the degradation reference current and the degradation coefficient (YES at Step S1403), the microcontroller 302 determines that the light source is degraded, and a process at the detection of degradation is performed (Step S1404). The process at the detection of degradation is initiated by transmitting a degradation detection signal to the GAVD 200 by the microcontroller 302. Then, the main CPU 300 detects that the degradation detection signal is input to the GAVD 200, and performs the process at the time of detection of degradation, such as forced shutdown of the apparatus or display of print interruption on the operation screen. Incidentally, although it is not illustrated in FIGS. 16 and 13, the image forming process is terminated after completion of the process at the time of detection of degradation.

If degradation is not detected, i.e., if the drive current is equal to or smaller than the product of the degradation reference current and the degradation coefficient (NO at Step S1403), the line APC and the sheet-interval APC are continued (Steps S1103 and S1106 in FIG. 13).

Figure 17:
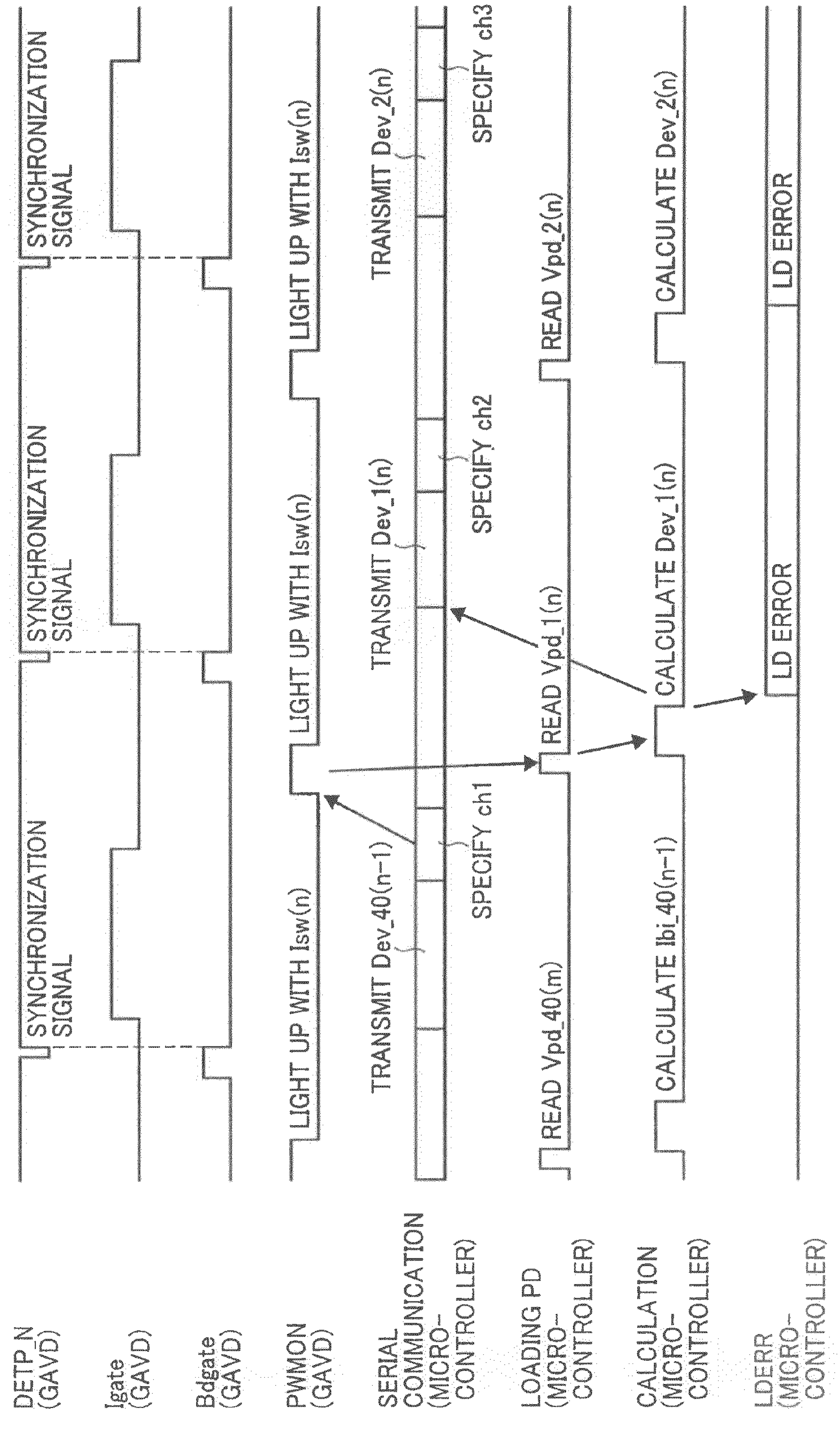
FIG. 17 is a timing chart of the line APC and the degradation determining process in the first embodiment.

FIG. 17 is a timing chart of the line APC and the degradation determining process performed by the GAVD 200 and the microcontroller 302. Incidentally, to explain the continuous line APC control, the timing chart in FIG. 17 shows from the point when the measurement for the channel 40 in the previous line APC is completed. As shown in FIG. 17, when the GAVD 200 receives a synchronization signal DETP_N from the synchronization detecting device 220, the GAVD 200 sets a gate "lgate" for writing image data onto the photosensitive drums 104*a*, 106*a*, 108*a*, and 110*a*. After that, the GAVD 200 issues a PWMON signal outside the image data area where "lgate" is negated. In this embodiment shown in FIG. 17, the GAVD 200 drives the semiconductor laser element LD of the channel 1 by applying Isw(n) to cause the semiconductor laser element LD of the channel 1 to generate a monitor beam.

The microcontroller 302 obtains Vpd_1(*n*), and calculates Dev_1(*n*). After completion of the calculation of Dev_1(*n*), the microcontroller 302 transmits Dev_1(*n*) to the GAVD 200 using serial communication, and provides confirmation of the value of Dev_1(*n*) to the driver 206. Furthermore, if degradation is detected in the determination of degradation of the light source described above, the microcontroller 302 issues a signal LDERR for informing that the laser element makes an error.

Then, the GAVD 200 specifies ch2 next, and calculates Dev_2(*n*). Since then, the process is repeatedly performed with respect to the subsequent channels sequentially in the order of ch3, ch4, . . . , ch40, ch1 until the printing operation is terminated.

(2-5) Sheet-Interval APC

Subsequently, the sheet-interval APC at Step S1106 shown in FIG. 13 is explained. During execution of the line APC, there is a possibility that a quantity of a laser beam cannot be corrected within a Dev variable range due to the degree of degradation of the light source or the temperature fluctuation after the VCSEL initialization. In this case, the value of Isw is just corrected to correct the quantity of the laser beam. However, if a major correction of the quantity of the laser beam is made during image formation, image defect is generated. Consequently, the image forming apparatus 100 executes correction of the common current Isw and update of the correction value Dev_ch(n) in response to the arrival of the sheet-interval timing.

A value of the common current Isw(n) to be updated is calculated using the current common current Isw(n−1) and the maximum and minimum values of the current correction values Dev_ch(n−1). The calculation of the common current Isw(n) is made by using an average value of the drive currents Isw×Dev_ch of all the channels or by using an average value of the maximum and minimum values of the drive currents Isw×Dev_ch of all the channels in the same manner as in the factory default setting or the VCSEL initialization. There is a difference as follows if the common current Isw(n) is obtained (1) from an average value of the drive currents of all the channels or (2) from an average value of the maximum value and the minimum value.

In the method of (1), for example, when only one channel out of the 40 channels is degraded, there is little change in the average value calculated. Instead, because the correction value Dev_ch of the degraded channel changes significantly, degradation of the light source is detected at a time when the channel is subjected to the determination of degradation.

In the method of (2), likewise, when only one channel out of the 40 channels is degraded, and the drive current of the channel is the maximum value of the drive currents of all the channels, the average value calculated changes significantly. Therefore, the common current Isw to be updated changes significantly. Consequently, because the correction value Dev_ch of each channel changes significantly, degradation of the light source is detected at a time when any of the channels other than the actually degraded channel is subjected to the determination of degradation.

Depending on characteristics of the VCSEL used or the specification of the image forming apparatus 100, any suitable one of the methods (1) and (2) may be selected.

Above description is the operation for updating the common current during normal image printing. On the other hand, when a printing job is continuously performed after the VCSEL initialization, or when it is in a standby state for a long time, the temperature around the light source may change the degradation reference current has been set. In this case, a change in drive current can occur due to the temperature change, and this change may be converted into an amount of degradation.

Consequently, it can be configured to calculate a new degradation reference current Isw(n)×Dev_ch(0) using the current common current Isw(n) when the predetermined number of sheets is printed out or a predetermined time has passed after the VCSEL initialization. This allows the change in current due to the temperature change after the VCSEL initialization to be absorbed and the change in current due to the degradation can be determined properly.

Furthermore, it can be configured to arrange a temperature sensor 224 in the optical writing device 102 and to update the degradation reference current using the current common current Isw(n) when a certain amount of change in temperature or more is recognized since the VCSEL initialization.

Second Embodiment

In the first embodiment, after the initialization process of the VCSEL, when the predetermined number of image formations are made, or when a predetermined time has passed, or when there is a predetermined amount of change in temperature, the degradation reference current is updated using the current common current Isw(n). In this method, the interval of time for updating the degradation reference current is long. There is a possibility that the change in drive current due to the temperature change is detected as the change due to degradation of the VCSEL 208.

In a second embodiment, the timing to update the degradation reference current is at the time of sheet-interval APC. Namely, when the common current Isw(n) is updated at the time of sheet-interval APC, at the same time, the degradation reference current is updated using the updated common current Isw(n). Thus, after the VCSEL initialization process, each time a printing job with respect to one sheet of paper medium (output medium) is executed, the degradation reference current can be updated. In this manner, a change in drive current due to the temperature change is absorbed in substantially real time (each time a printing job with respect to one sheet is executed), so degradation of the VCSEL can be determined more accurately than in the first embodiment.

Incidentally, in the first embodiment, after the initialization process of the VCSEL (Step S1101 in FIG. 13), the degradation reference current Isw(1)×Dev_ch(0) is set (Step S1102), and in the subsequent image forming operation (Steps S1103 to S1107), degradation is determined using the degradation reference current set at Step S1102. Namely, in the first embodiment, degradation is determined from a magnitude relation between η×Isw(i)×Dev_ch(0), which is the product of the degradation reference current and the degradation coefficient, and the current drive current Isw(n)×Dev_ch(n).

On the other hand, in the second embodiment, the degradation reference current is updated to Isw(n)×Dev_ch(0) each time the sheet-interval APC (Step S1106 in FIG. 13) is executed. Namely, in the second embodiment, the degradation reference current is Isw(n)×Dev_ch(0), and the portion of common current Isw(n) is common to the degradation reference current and the present drive current. Therefore, in the second embodiment, degradation can be determined using only a correction value of the drive current. Namely, degradation can be determined from a degradation reference correction value η×Dev_ch(0) and a current correction value Dev_ch(n).

For example, the microcontroller 302 determines whether a current correction value of the drive current Dev_ch(n) is larger than η×Dev_ch(0), which is a product of the initial correction value Dev_ch(0) and a degradation coefficient. If the current correction value is larger than the product of the initial correction value and the degradation coefficient, the microcontroller 302 determines that the light source is degraded.

As described above, the image forming apparatus 100 according to the first or second embodiment can correct the light quantity of the VCSEL 208 by effectively using the emission of multiple laser beams from the VCSEL 208. Furthermore, as a reference value used for determining degradation, not a fixed value common to the image forming apparatuses but a dynamically-calculated value after the start-up of the apparatus can be used. Namely, it is possible to prevent incorrect determination due to the effects of the temperature change and the like with minimalizing an increase in circuit size and to efficiently manage the status of degradation of multiple laser beams and the like.

According to the present invention, it is possible to prevent incorrect determination due to the effects of a change in temperature of a light source and the like with minimalizing an increase in circuit size and to efficiently manage the status of degradation of multiple laser beams and the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device comprising:

a light source that emits multiple laser beams;

a separating unit that separates each of the multiple laser beams into a monitor beam for measuring a quantity of light and a scanning beam for scanning a photoreceptor to form an image of image data;

a photoelectric conversion unit that measures a light quantity of the monitor beam and outputs a monitor voltage with respect to each of the multiple laser beams depending on the light quantity of the monitor beam;

a storage unit that stores therein a plurality of predetermined initial correction values with respect to the multiple laser beams as initial values of correction values for correcting a set common current which is common to the multiple laser beams and used for emitting the laser beams from the light source;

a calculating unit that updates the common current on the basis of the monitor voltages, and calculates reference currents for the respective laser beams by correcting the updated common current with the initial correction values;

a control unit that calculates correction values by updating the initial correction values on the basis of the monitor voltages, obtains corrected currents by correcting the updated common current with the calculated correction values, and controls each light quantity of each of the laser beams on the basis of each of the corrected currents; and a determining unit that obtains ratios of the respective corrected currents to the reference currents, determines whether any of the ratios is larger than a predetermined threshold value, and determines that the light source is degraded if the ratios is larger than the threshold value.

2. The optical writing device according to claim 1, wherein the calculating unit updates the common current on the basis of the monitor voltages, which are output before image forming is initiated, and calculates the reference currents.

3. The optical writing device according to claim 1, wherein the control unit further updates the common current to an average value of the corrected currents obtained with respect to the multiple laser beams.

4. The optical writing device according to claim 3, wherein the calculating unit further calculates the reference currents each time the number of image formations of the image data reaches a predetermined number.

5. The optical writing device according to claim 3, wherein the calculating unit further calculates the reference currents each time a predetermined time passes since the reference currents were previously calculated.

6. The optical writing device according to claim 3, further comprising a sensor that measures a temperature near the light source, wherein the calculating unit further calculates the reference currents each time a certain amount of change in temperature from a temperature measured when the reference currents were previously calculated is recognized.

7. The optical writing device according to claim 3, wherein the calculating unit further calculates the reference currents in a time from when scanning of the photoreceptor by the scanning beam for an output medium is completed and till when next scanning of the photoreceptor for a next output medium is begun.

8. The optical writing device according to claim 7, wherein the determining unit obtains ratios of the correction values updated by the control unit to the respective initial correction values as the ratios of the corrected currents to the respective reference currents, respectively.

9. The optical writing device according to claim 1, wherein the control unit further obtains the maximum and minimum values of the corrected currents obtained with respect to the multiple laser beams, and updates the common current to an average value of the maximum value and the minimum value.

10. An optical writing method that is executed by an optical writing device including a light source that emits multiple laser beams, the optical writing method comprising:

separating, by a separating unit, each of the multiple laser beams into a monitor beam for measuring a quantity of light and a scanning beam for scanning a photoreceptor to form an image of image data of image data by a separating unit;

measuring a light quantity of the monitor beam to output a monitor voltage with respect to each of the multiple laser beams depending on the light quantity of the monitor beam by a photoelectric conversion unit;

storing a plurality of initial correction values predetermined with respect to the multiple laser beams in a storage unit as initial values of correction values for correcting a set common current which is common to the multiple laser beams and used for emitting the laser beams from the light source;

calculating reference currents by correcting the common current with the respective initial correction values after updating the common current on the basis of the monitor voltages by a calculating unit;

controlling each light quantity of each of the laser beams on the basis of each of corrected currents by a control unit, the corrected currents being obtained by correcting the updated common current with correction values that have been calculated by updating the initial correction values on the basis of the monitor voltages;

obtaining ratios of corrected currents to the respective reference currents, determining whether any of the ratios is larger than a predetermined threshold value, and determining that the light source is degraded if any of the ratios is larger than the predetermined threshold value by a determining unit.

11. The optical writing method according to claim 10, wherein the calculating of the reference currents includes updating the common current on the basis of the monitor voltages, which are output before image forming is initiated, for calculating the reference currents.

12. The optical writing method according to claim 10, wherein the controlling of the light quantity further includes updating the common current to an average value of the corrected currents obtained with respect to the multiple laser beams.

13. The optical writing method according to claim 12, wherein in the calculating of the reference currents, the reference currents are calculated each time the number of image formations of the image data reaches a predetermined number.

14. The optical writing method according to claim 12, wherein in the calculating of the reference currents, the reference currents are calculated each time a predetermined time passes since the reference currents were previously calculated.

15. The optical writing method according to claim 12 further comprising measuring a temperature near the light source by a sensor, wherein in the calculating of the reference currents, the reference currents are calculated each time a certain amount of change in temperature from a temperature measured when the reference currents were previously calculated is recognized.

16. The optical writing method according to claim 12, wherein in the calculating of the reference currents, the reference currents are calculated in a time from when scanning of the photoreceptor by the scanning beam for an output medium is completed and till when next scanning of the photoreceptor for a next output medium is begun.

17. The optical writing method according to claim 16, wherein in the obtaining the ratios, ratios of the correction values updated by the control unit to the respective initial correction values are obtained as the ratios of the corrected currents to the reference currents, respectively.

18. The optical writing method according to claim 10, wherein the controlling of the light quantity further includes obtaining the maximum and minimum values of the corrected currents obtained with respect to the multiple laser beams, to update the common current to an average value of the maximum value and the minimum value.

* * * * *